United States Patent [19]
Blackwell

[11] 3,879,355
[45] Apr. 22, 1975

[54] ARYLENE SULFIDE POLYMER CURED WITH THE AID OF CERTAIN COMPOUNDS

[75] Inventor: Jennings P. Blackwell, Bartlesville, Okla.

[73] Assignee: Phillips Petroleum Company, Bartlesville, Okla.

[22] Filed: Nov. 29, 1973

[21] Appl. No.: 420,256

[52] U.S. Cl.............. 260/79; 260/79.1; 117/132 R; 117/161 R
[51] Int. Cl............................................. C08g 23/00
[58] Field of Search............................. 260/79, 79.1

[56] References Cited
UNITED STATES PATENTS

| 3,658,753 | 4/1972 | Reed et al............................. 260/79 |
| 3,728,313 | 4/1973 | Hill, Jr. et al........................ 260/79 |

*Primary Examiner*—Melvyn I. Marquis

[57] ABSTRACT

Certain compounds are incorporated into arylene sulfide polymer. The resulting composition is precured to give a polymer of improved processability and/or applied to a substrate and cured to give a coating having improved characteristics.

10 Claims, No Drawings

ARYLENE SULFIDE POLYMER CURED WITH THE AID OF CERTAIN COMPOUNDS

BACKGROUND OF THE INVENTION

This invention relates to improving the characteristics of arylene sulfide polymer compositions.

It is known that arylene sulfide polymers are useful in coatiing applications. Coating formed thereof are strong, heat stable and resistant to most industrial chemicals and fumes. Thus, for example, arylene sulfide polymers can be advantageously employed as coating for metals such as steel, aluminum, nickel, brass, copper, as well as ceramics, glass and other substrates stable at the curing temperature required for the coating which can run as high as 800°F.

Arylene sulfide polymer is also ideally suited for other molding techniques such as extrusion and injection molding. However, in many instances the polymer as produced, while having a very high melting point, nonetheless has an extremely low melt viscosity with the melt flow number (MFN) as measured by ASTM D 1238-65T (modified to use a 5 kilogram weight and a temperature of 343°C.) being greater than 2500 g in 10 minutes. To be usable in such applications, a melt flow in the range of only 1–200 is generally required.

BRIEF SUMMARY OF THE INVENTION

It is an object of this invention to provide an improved arylene sulfide polymer coated substrate; it is yet a further object of this invention to provide coating compositions comprising arylene sulfide polymers having enhanced processability, coating flexibility, and coating adherence; it is yet a further object of this invention to provide arylene sulfide coating compositions which can be cured at a relatively fast rate to form good, adherent, flexible coatings for metal and other materials without subjecting same to undesirably high temperatures; and it is still yet a further object of this invention to provide an arylene sulfide polymer composition having improved processability.

In accordance with this invention arylene sulfide polymer is compounded with at least one of (a) aluminum phosphate, (b) a polyfunctional benzene derivative in which at least two positions on the benzene nucleus are replaced by a functional group selected from (OH) and/or (NH₂) with the substitution being in the meta or para positions if only two positions are substituted, such compounds being represented by the following formula

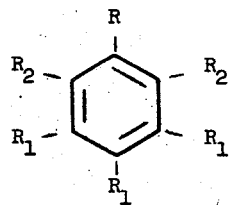

wherein R is OH or NH$_2$ and at least one R$_1$ is R, R$_2$ is H and the remaining R$_1$ entities are H or R, (c) a metal salt selected from cobalt sulfate, cobalt acetate, ferrous sulfate, or cupric naphthenate; and (d) ammonium persulfate. The resulting mixture is subjected to heat to at least partially cure the polymer.

DESCRIPTION OF THE PREFERRED EMBODIMENTS

The invention is applicable for use with any normally solid, heat curable, high molecular weight arylene sulfide polymer. The preferred arylene sulfide polymer is poly(phenylene sulfide) (PPS) having a melting or softening point of at least 300°F, preferably 400°F to 850°F. Such polymer can be made in accordance with Edmonds et al, U.S. Pat. No. 3,354,129, Example I for instance, the disclosure with patent is hereby incorporated by reference. The preferred polymers have an inherent viscosity in chloronaphthalene at 206°C of at least 0.1, preferably between 0.1 and 0.3, more preferably between 0.13 and 0.23. A particularly preferred polymer is poly(phenylene sulfide) having a melt flow of from 50 to about 2500 (limit of the instrument measurement by ASTM D 1238-65T, modified to use 5 kilogram weight and a temperature of 343°C). The virgin PPS which normally may have a melt flow number of above 2500 can be precured by heatiing in air at 500 to 520°F for 1–6 hours to lower the initial melt flow for instance to the above 50 to 2500 range.

The compounds which can be used in accordance with this invention to modify the curing of poly(arylene sulfide) are (a) aluminum phosphate, (b) polyfunctional benzene derivatives in which at least two positions on the benzene nucleus are replaced by a functional group selected from (OH) and/or (NH$_2$) with the substitution being in the meta or para positions if only two positions are substituted, (c) a metal salt selected from cobalt sulfate, cobalt acetate, ferrous sulfate, or cupric naphthenate; and (d) ammonium persulfate.

The additives of this invention can be incorporated into the polymer prior to curing in any convenient manner. Thus, for example, the additives can be added as such to the polymer and the resulting mixture can be agitated in any convenient manner to achieve good mixing. A particularly convenient manner of introducing the additives into the polymer is the addition of the additive dissolved in a volatile solvent such as hexane, benzene, acetone and the like to the polymer in powder form with subsequent volatilization of the solvent. Alternatively the additive dissolved in said solvent can be ball milled with powdered polymer. The additives can be melt blended but this is less preferred.

There are two broad aspects to this invention.

First, the additives of the invention are useful in accelerating the cure of virgin arylene sulfide polymer which has a melt flow too high to be useful in such applications as injection molding (precuring). Such polymer can be heated in air at a temperature of about 490° to 520°F, preferably 500° to 510°F for 1 to 10 preferably 2 to 6 hours to lower the original melt flow. Incorporation of additives to this invention allows for reduction in the time required to effect this lowering of melt flow or in the alternative, allows further reduction in melt flow for a given time, Thus, for instance, a polymer with a melt flow of 2500 or greater which is not suitable for fabrication operations such as injection molding can be heated after incorporation of the additive in accordance with the invention for 6 hours at 510°F to bring the melt flow into the range of 0 to 15, preferably 1 to 15, This melt flow is measured in terms of MFN (melt flow number) which is the grams of polymer flowing from an orifice in 10 minutes utilizing ASTM D 1238-65T, modified as noted to utilize a 5 kilogram weight and to operate at 650°F. (343°C). The polymer during this pre-curing operation is generally in the solid state.

The use of the compounds of this invention speeds up the cure rate of either slow curing or fast curing resins. For example, a slow curing arylene sulfide polymer will ordinarily require 6 hours at 510°F in air curing time to have a melt flow of less than about 400 without accelerators. A fast curing resin will cure to a melt flow of less than about 400 in 2-4 hours at 510°F. Very fast curing resins will cure to a melt flow of less than 100 in 1-2 hours at 510°F in air without additives.

Thus, in accordance with the first aspect of this invention, a virgin polymer with a melt flow of 50 to above 2500 which is unsuitable for many applications can be made suitable for such applications after a relatively short curing time by utilizing the additives of this invention.

In accordance with the second aspect of the invention, the additives are incorporated into arylene sulfide polymer which is utilized in a coating composition (curing). This allows reduction of the curing temperature from the normal level which can run as high as 800°F down to within the range of 575° to 725°F, preferably about 600° to 700°F. The temperature obviously is related to the particular polymer utilized and to the time, of course, but in any event for a given polymer in a given curing time, the temperature for achieving a cure sufficient to give a good coating can be reduced preferably at least 100°F below the temperature required to give a coating of similar quality without the additive. Similarly at a given cure temperature, the cure time can be reduced at least 10 minutes below the time required to give a coating of similar quality without the additive. The curing time will generally be from 10 to 40 minutes, preferably 15 to 30 minutes. Times of 15 to 20 minutes are particuarly suitable. In addition to decreasing the cure time and/or temperature required, the coatings made in accordance with the invention have increased flexibility.

Thus, in accordance with this second aspect of the invention, the time and/or temperature required to cure a coating on a substrate can be reduced so as to allow coating of many substrates which would be adversely affected by the higher temperature and/or curing time. In fabricating pipe, for instance, the exposure of a substrate to long periods of high temperatures is undesirable because metal has a tendency toward embrittlement under such severe conditions. As with the first aspect of the invention, either a slow or fast curing arylene sulfide polymer can be used, although in all aspects of the invention the advantage is greater with the slow curing polymers.

In addition to the additives of this invention, the compositions of this invention can contain other ingredients conventionally employed in arylene sulfide polymer compositions. For instance, fillers such as titanium dioxide, calcium carbonate, aluminum oxide, aluminum silicate, pigments, resins and/or plasticizers, ferric oxide, silicon dioxide, asbestos fibers, glass fibers, poly(tetrafluoroethylene), and the like can be present. Preferably the coating compositions will contain, based on 100 parts by weight polymer, 10 to 50 parts by weight of a filler pigment such as titanium dioxide and/or poly(tetrafluoroethylene).

When arylene sulfide polymer compositions in accordance with this invention are used as coating materials, the coatings can have a thickness of 0.25 to 25 mils. It is also within the scope of the invention to utilize a plurality of layers of the polymeric composition with the material being cured or at least partially cured between each coat. Preferably the total thickness will be in the range of 0.5 to 50 mils. The invention has been found to be of particular utility in the production of relatively thin coatings, that is coatings in which each layer has a thickness of about 0.5 to 5 mils.

The additives of this invention are employed in an amount within the range of 0.5 to 10, preferably 1 to 5, more preferably 1 to 3 weight percent based on the weight of the arylene sulfide polymer.

EXAMPLE I

Formulations were prepared in a Waring blender using the proportions of 100 parts poly(phenylene sulfide) or PPS, 33 parts $TiO_2$, plus the additive, in 200 parts of propylene glycol. The solid additives were first powdered and predispersed in some of the glycol; inorganic salts were first dissolved in a little water to obtain better dispersion of the additive. The coating test procedure was as follows:

1 Cold rolled steel coupons, 3 × 6 × 0.035 in. were cleaned, grit-blasted and heated with a gas-oxygen flame to a blue-gray color.

2. Three coats of the formulation were applied to the coupon with a No. 60 coating rod; each coat was cured at the same conditions, usually 30 min. at 600°F.

3. After the third coat was cured and cooled, the coupon was annealed for 2 hours at 450°F, then cooled to room temperature.

4. The coated coupons were bent over a three-sixteenths-inch mandrel and the elongated portion was examined at 20X magnification. The coating was rated 1–5 as follows:

| Rating | Observation |
|---|---|
| 1 | No cracking on elongated portion of the coating (very good) |
| 2 | Occasional microcracks along elongated coating (good) |
| 3 | Numerous microcracks and some cracking barely visible to the unaided eye. (not acceptable) |
| 4 | Continuous and easily visible cracks. (poor) |
| 5 | Complete rupture of the coating. (very poor) |

The aluminum phosphate solution was obtained by ball-milling aluminum hydroxide (120 g) in 165 ml of 85% phosphoric acid for 3.5 hrs., followed by dilution with 300 ml water to give about 27% $AlPO_4$ in solution. Sufficient solution was used in preparation of the slurry to give the final concentration of $AlPO_4$ in the coating formation.

The poly(phenylene sulfide) was Ryton PPS Grade V-1, virgin polymer, melt flow 2000 as measured by ASTM D 1238-65T, modified to operate at 343°C. with a 5 kilogram weight. This was a fast curing resin as evidenced by the fact that it could be cured to a melt flow of 5.1, 510°F, air cure, with no additive.

Test results are given in the table below:

TABLE I

| Additive | Conc.[1] | Curing T., °F. | Curing Time, Minutes | Rating (1 is best) |
|---|---|---|---|---|
| Control, no Additive | | 700 | 10 | 2 |
| Control, no Additive | | 700 | 30 | 1 |
| Control, no Additive | | 600 | 60 | 3 |
| Control, no Additive | | 600 | 30 | 3 |
| AlPO$_4$ | 3 | 600 | 30 | 1 coat rough[2] |
| | 1.5 | 600 | 30 | 2–3 coat rough |
| 1,2,3 trihydroxy-benzene | 10 | 600 | 30 | 1 coat rough |
| 1,2,3 trihydroxy-benzene | 10 | 600 | 15 | 2–3 coat rough |
| 1,2,3 trihydroxy-benzene | 5 | 600 | 30 | 1 coat rough |
| p-Aminophenol | 10 | 600 | 30 | 2–3 coat rough, dark |
| 1,3 dihydroxy benzene | 10 | 600 | 15 | 2 coat rough |
| 1,3 dihydroxy benzene | 10 | 600 | 30 | 3 coat rough |

[1] parts by weight per 100 parts PPS (Php)
[2] a rough coating is still acceptable and, as can be seen, is obtained at a lower temperature which in some applications is essential.

The results show that all the additives tested will either produce a good coating, rating of 1 or 2, or at least a borderline acceptable coating with a rating of 2–3 at 600°F cure even at the shorter 15 minute curing time when used at the concentrations tested. The 1,2,3,trihydroxybenzene and AlPO$_4$ give excellent results at low levels. The last run apparently reflects experimental error or overcure.

While not tested, it is believed based on the chemicals that were tested that para-phenylenediamine would also be a preferred additive.

EXAMPLE II

The same polymer was used to form coatings in the same manner as in Example I utilizing the following additives with the results given in the table hereinbelow.

TABLE II

| Additive | Conc, php | Curing T., °F. | Curing Time Minutes | Rating (1 is best) |
|---|---|---|---|---|
| Cobalt sulfate | 10 | 600 | 30 | 3[1] |
| | 10 | 600 | 15 | 2–3 |
| Cobalt acetate | 10 | 600 | 30 | 2 |
| Ferrous sulfate | 2 | 600 | 30 | 2–3[2] |
| Cupric naphthenate | 10 | 600 | 30 | 2–3 |

[1] May be poor due to experimental error or overcure.
[2] Produced mixed results at 2 phr in thicker (12 mil) coatings.

These results show that all of the additives tested will produce an acceptable coating with a rating varying from 2 to 2–3.

EXAMPLE III

The same polymer of Example I was compounded and applied to two coupons in the same manner as in Example I with other additives with the results shown hereinbelow in Table III.

TABLE III

| Additive | Conc, php | Curing T., °F. | Curing Time, Minutes | Rating (1 is best) |
|---|---|---|---|---|
| Ammonium persulfate | 10 | 600 | 30 | 2 |

These results show that a good coating rating of 2 is produced using persulfate.

EXAMPLE IV

The same fast curing polyphenylene sulfide of Example I was mixed with certain additives and precured at 475°F. with the melt flow number thereafter being determined. The results were as follows.

TABLE IV

| Heating Time, hrs. | MFN[1] Virgin Polymer Control, No Additive | MNF 5 phr Cobalt Acetate | MNF 10 phr 1,2,3-trihydroxy benzene |
|---|---|---|---|
| 1 | 1750 | 0[2] | 42 |
| 2 | 440 | 96 | 25 |
| 3 | 260 | 85 | |
| 4 | 165 | 66 | |

[1] flow g/10 minutes as previously defined.
[2] Low value - apparently the result of experimental error.

These data reveal that compositions of this invention in addition to producing better coatings also can be precured so as to produce a polymer having a melt flow which is suitable for extrusion or injection molding whereas the original melt flow (approximately 2000) would be so high that the polymer would be useless for such applications.

While this invention has been described in detail for the purpose of illustration, it is not to be construed as limited thereby but is intended to cover all changes and modifications within the spirit and scope thereof.

What is claimed is:

1. A composition of matter comprising an arylene sulfide polymer and 0.5 to 10 weight percent based on the weight of said arylene sulfide polymer of a compound selected from the group consisting of
    a. aluminum phosphate
    b. a polyfunctional benzene derivative in which at least two positions on the benzene nucleus are replaced by a functional group selected from OH and $NH_2$ with the substitution being in the meta or para position if only two positions are substituted;
    c. a metal salt selected from cobalt sulfate, cobalt acetate, ferrous sulfate, or cupric naphthenate; and
    d. ammonium persulfate.

2. A composition according to claim 1 wherein said compound is present in an amount within the range of 1 to 5 weight percent based on the weight of said polymer.

3. A composition according to claim 1 wherein said compound is aluminum phosphate.

4. A composition according to claim 1 wherein said compound is selected from the group consisting of para-amino phenol, 1,3-dihydroxybenzene, and 1,2,3-trihydroxybenzene.

5. A composition according to claim 1 wherein said compound is selected from the group consisting of cobalt sulfate, cobalt acetate, ferrous sulfate, and cupric naphthenate.

6. A composition according to claim 1 wherein said compound is ammonium persulfate.

7. A composition according to claim 1 wherein said polymer is polyphenylene sulfide.

8. A method for precuring an arylene sulfide polymer comprising incorporating into said polymer 0.5 to 10 weight percent based on the weight of said arylene sulfide polymer of a compound selected from the group consisting of
    a. aluminum phosphate;
    b. a polyfunctional benzene derivative in which at least two positions on the benzene nucleus are replaced by a functional group selected from OH and $NH_2$ with the substitution being in the meta or para posititon if only two positions are substituted;
    c. a metal salt selected from cobalt sulfate, cobalt acetate, ferrous sulfate, or cupric naphthenate; and
    d. ammonium persulate,
    and thereafter heatiing said composition to a temperature within the range of 490° to 520°F for a time within the range of 1 to 10 hours.

9. A method according to claim 8 wherein said polymer is a slow curing poly(phenylene sulfide).

10. A composition of matter comprising an arylene sulfide polymer and an effective cure accelerating amount of a compound selected from the group consisting of
    a. aluminum phosphate
    b. a polyfunctional benzene derivative in which at least two positions on the benzene nucleus are replaced by a functional group selected from OH and $NH_2$ with the substitution being in the meta or para position if only two positions are substituted;
    c. a metal salt selected from cobalt sulfate, cobalt acetate, ferrous sulfate, or cupric naphthenate; and
    d. ammonium persulfate.

* * * * *